United States Patent
Wittenberg (10) Patent No.: US 6,572,148 B2
(45) Date of Patent: Jun. 3, 2003

(54) SEAT BELT SECURITY SYSTEM HAVING A MEASUREMENT DEVICE FOR DETERMINING A SEAT BELT PULLING FORCE

(75) Inventor: Geert Helge Wittenberg, Hamburg (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/870,548

(22) Filed: May 30, 2001

(65) Prior Publication Data
US 2002/0008376 A1 Jan. 24, 2002

(30) Foreign Application Priority Data

May 30, 2000 (DE) .......................... 100 26 444

(51) Int. Cl.⁷ .......................... B60R 22/00; B60R 21/00
(52) U.S. Cl. ....................... 280/808; 180/268
(58) Field of Search ............... 280/801.1, 808; 180/268; 297/468, 483; 340/457.1

(56) References Cited

U.S. PATENT DOCUMENTS

| | | | | |
|---|---|---|---|---|
| 6,079,744 A | * | 6/2000 | Husby et al. | 280/801.1 |
| 6,081,759 A | * | 6/2000 | Husby et al. | 701/45 |
| 6,082,481 A | * | 7/2000 | Engler | 180/268 |
| 6,209,915 B1 | * | 4/2001 | Blakesley | 280/801.1 |
| 6,211,793 B1 | * | 4/2001 | Smithson | 340/665 |
| 6,260,879 B1 | * | 7/2001 | Stanley | 280/735 |

FOREIGN PATENT DOCUMENTS

| | | |
|---|---|---|
| DE | 43 26 198 A1 | 2/1994 |
| DE | 199 50 552 A1 | 4/2000 |
| EP | 0 830 994 A1 | 3/1998 |
| WO | WO 99/29538 | 6/1999 |

OTHER PUBLICATIONS

Patent Abstracts of Japan JP 63305057 A.
Patent Abstracts of Japan JP 60154937 A.

* cited by examiner

*Primary Examiner*—Paul N. Dickson
*Assistant Examiner*—Laura B. Rosenburg
(74) *Attorney, Agent, or Firm*—R W Becker & Associates; R W Becker (57) ABSTRACT

A seat belt system for a motor vehicle is provided that includes a seat belt retractable from a seat belt winding roller and having an extent which passes to and through a connecting tongue for releasably connecting the seat belt to a seat latch and having an end secured to an end fixture fixedly connected to the motor vehicle. An electrical lead extends along at least a portion of the longitudinal extent of the seat belt. A measuring device measures a variation in an electrical property of the electrical lead, which varies in correspondence with the extension of the seat belt due to the application of a pulling force on the seat belt. An evaluation device evaluates the measurements performed by the measuring device to yield an output representative of the pulling force applied to the seat belt.

16 Claims, 6 Drawing Sheets

SEAT BELT SECURITY SYSTEM HAVING A MEASUREMENT DEVICE FOR DETERMINING A SEAT BELT PULLING FORCE

BACKGROUND OF THE INVENTION

The present invention relates to a seat belt system for motor vehicles which are of the type having a seat belt windable onto and retractable from a seat belt winding roller fixedly connected to the motor vehicle and extending to and through a connecting tongue which is releasably couplable to an end fixture fixedly connected to the vehicle, whereby an electrical lead extends along at least a portion of the seat belt.

In particular, in connection with the operation of a seat belt system in cooperation with an airbag apparatus and/or with a force limiting device, efforts are made to capture or determine the information concerning the tension arising in a deployed or loaded seat belt due to the application thereonto of a pulling force, in order to draw therefrom conclusions concerning the control of the operation of the airbag apparatus and/or of the force limiting device. For example, as is disclosed in DE 43 26 198 A1, a seat belt windup roller is intermediately connected to a force measuring cell which acts as a tension detector. With such a device, which comprises an external measurement apparatus, the output is imprecise and, at the same time, the device can only be installed and adjusted with considerable effort.

SUMMARY OF THE INVENTION

The present invention offers a solution to the challenge of providing a seat belt system that provides an immediate or instant measurement of the pulling force applied to the textile seat belt without the need for an intermediate activation of an external measuring apparatus.

The present invention thus makes use of a conventionally known arrangement of an electrical lead in a textile seat belt, as is shown, for example, in the arrangement disclosed in EP 0 830 994 A1; in this known seat belt security system, an electrical lead is integrated into the seat belt to serve as an antenna and, to this extent, is a component of a code capturing unit in an anti-theft system, in that the antenna arranged in the seat belt receives a code signal provided by a person having permission to occupy the vehicle and transmits the signal to an evaluation unit. It is not possible, however, to employ such an arrangement for the transmission of a signal indicating the pulling force on a seat belt.

The present invention provides, in further details thereof, an electric conductor extending along a seat belt, which has been unwound from a seat belt roller, and connectable to an electric supply source. A further aspect of the present invention is a measurement device for measuring the variation in the electrical properties of the electrical lead, which change as a function of the extension of the seat belt and are produced due to the application of force on the seat belt and the present invention includes. In yet a further aspect thereof, an evaluation device is provided for transforming the signal transmitted thereto by the measurement device into the respective seat belt force value. The present invention provides the advantage that the one or several conductors formed into the seat belt permit an instantaneous transmission of measurement signals, which are correspondingly received in suitable measurement devices and provided to a thereafter actuated evaluation device for conversion into the respective seat belt force values. A capture and transformation of the measurement signals in this manner is, for example, known in connection with the deployment of strain measurement bands as a basic concept.

In accordance with one embodiment of the present invention, it is provided that the electrical lead is woven into the seat belt. In an arrangement of this type, the electrical lead must possess the same or, at least, similar mechanical properties as the textile material such as, preferably, a reduced modulus of elasticity.

In accordance with a first embodiment of the present invention, it can be provided that the electrical connection is arranged with several leads extending in the direction of the elongate or longitudinal axis of the seat belt and organized into lead bands; in this embodiment of the present invention, the changes in the electrical resistance in the electrical leads or, respectively, the individual lead bands, which occur as a function of the extension of the seat belt, are sensed.

In another embodiment of the present invention, it is provided that the electrical lead is configured in a meandering or serpentine configuration extending transversely to the longitudinal axis of the seat belt and arranged in lead bands. Upon the application of an electrical current in such an electrical lead configuration, an annular magnetic field is formed around the individual lead bands, which penetrates through the lead loops in an opposite direction. In connection with the extension of the seat belt due to the application of a pulling or tensioning force, corresponding relative movement between the individual lead loops induces a voltage potential in the electrical leads and this voltage variation can be sensed as a variation in the electrical resistance; it is, however, also possible to instantly detect the variation of the magnetic field by, for example, a Hall sensor and to transmit immediately a signal representative of the extension of the seat belt.

In accordance with another embodiment of the present invention, it can be provided that one electrical lead extends on the seat belt along the longitudinal axis thereof and another electrical lead extends in serpentine manner transverse to the longitudinal axis of the seat belt, with the one electrical lead and the other electrical lead overlying one another and two measurement apparatus are provided for measuring the respective signals provided from the two electrical leads. An arrangement such as this makes possible, in addition, a determination of the length of the withdrawn seat belt or, respectively, a determination of the rate of unwinding or extension of the seat belt, as is further provided in another aspect of an embodiment of the present invention, in that the length of the unwound seat belt can be measured by a count of the loops of the electrical lead passing by a counting location, whereupon this counting result can be factored together with a consideration of the elapsed time of the seat belt unwinding movement to yield, as well, a determination of the rate of unwinding of the seat belt.

In accordance with one embodiment of the present invention, it is provided that a supply electrical lead, which is connected to a voltage supply, is configured on the seat belt and a sensor lead separate from the supply lead is arranged as well on the seat belt, whereby the measurement apparatus is connectable to the sensor lead. In this connection, an electrical voltage potential is applied to the supply electrical lead, which produces a corresponding magnetic field. Consequently, an extension of the seat belt produces relative movement between the supply lead and the sensor lead and thereby induces a voltage potential in the sensor lead which is sensed by corresponding sensors. It can also be imagined that the capacitance between the supply lead and the sensor lead can be measured or captured, as the capacitance reduces in correspondence with the increasing distance between the supply lead and the sensor lead which occurs as the seat belt is further extended.

As the electrical lead bands are preferably continuously formed in the seat belt web during its manufacture, the individual electrical lead bands must, following the layout of the seat belt, be configured into closed electrical current loops with one another and, in connection with an aspect of one embodiment of the present invention, it is provided that this connection between the electrical lead bands is provided by a bridging clip on the seat belt.

In connection with one embodiment of the present invention, it is provided that the seat belt is formed of a web comprised of fibers having electrical connecting or conducting properties.

In accordance with an embodiment of the present invention, it is provided that the electrical energy supply of the electrical leads is accomplished in a wireless manner via an electrical supply winding which encircles the seat belt.

In connection with the configuration of the measurement device in one embodiment of the present invention, it is provided that the measurement device comprises a contact located at a fixed location fastening point of the seat belt; such contacts can be arranged especially in the region of the securement of the seat belt on the shaft or pin of the seat belt winding roller as well as at the vehicle fixed connection end fixture.

In another embodiment of the present invention, the measurement device includes sensors which are arranged out of contact with the seat belt, whereby, in accordance with the respective layout and arrangement of the electrical lead or, respectively, the electrical lead bands, the sensors are configured as inductive sensors, magnetic sensitive sensors, or Hall sensors. It can further be provided that the sensors capture capacitance measurements.

BRIEF DESCRIPTION OF THE DRAWINGS

The object and advantages of the present invention will be explained in more detail with the aid of the accompanying drawings, in which:

FIG. 3a is an enlarged view of a portion of a seat belt having electrical leads extending in the longitudinal direction of the seat belt and including the bridging clips arranged at the portion of the seat belt at the end fixture connection;

FIG. 3b is a schematic view of the path of the leads of the seat belt portion shown in FIG. 3a;

DETAILED DESCRIPTION OF THE PREFERRED EMBODIMENTS

Figure 1:
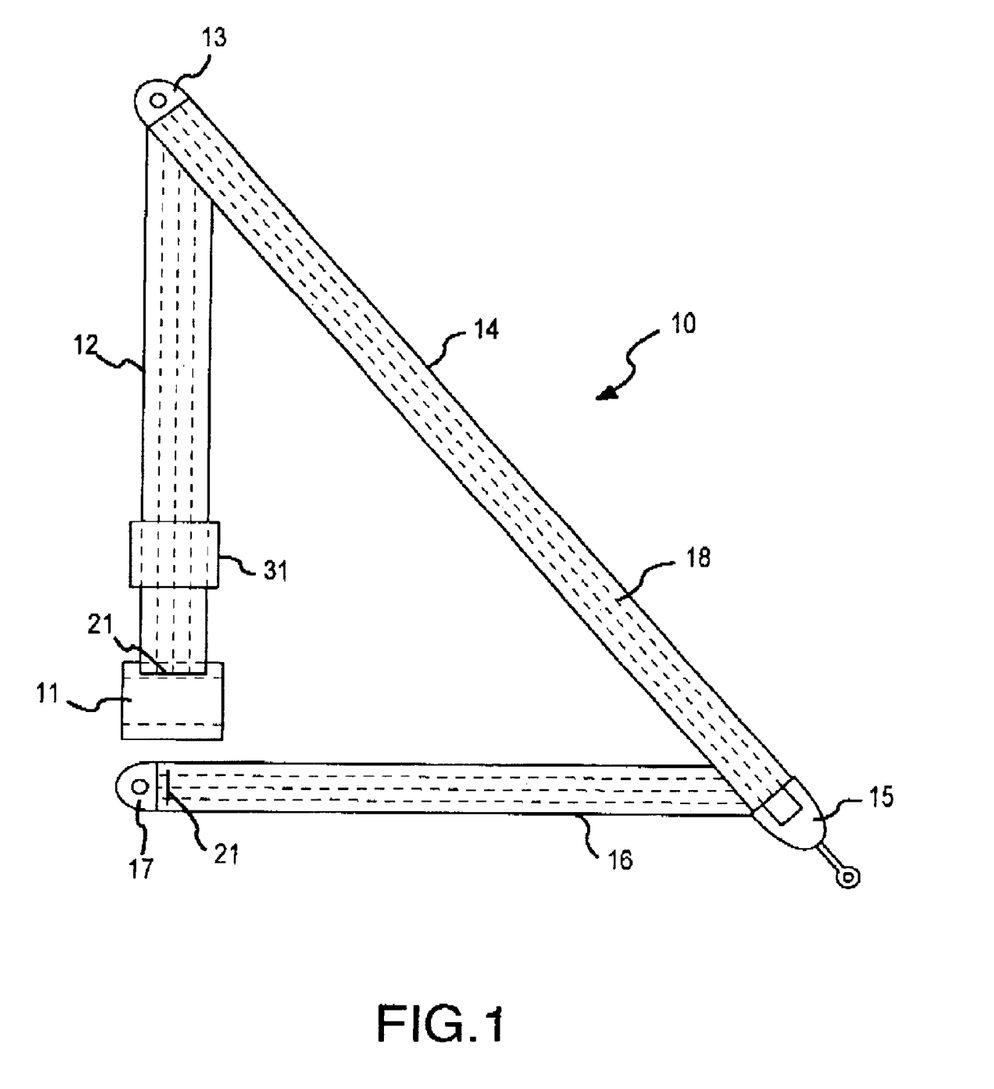
FIG. 1 is a schematic view of a three point seat belt system with an integrated electrical lead.

FIG. 1 is a schematic view of a seat belt system 10 having a seat belt winding roller 11. The seat belt extends from a first seat belt portion 12 at a B column (designated as reference number 37 in FIG. 5) of a motor vehicle to a change of direction fixture 13 disposed above the first seat belt portion 12, with the seat belt thereafter extending as a shoulder belt portion 14 to a belt coupling 15 and, thereafter, following a change of direction, extending as a lap belt 16 to an end fixture 17 fixedly connected to the motor vehicle. Electrical leads 18 or, respectively, electrical lead bands 18a, extend in parallel paths. To the extent that the electrical leads 18 or, respectively, the electrical lead bands 18a, which are woven into the seat belt 40, are truncated or cut at longitudinally spaced locations along the extension of the seat belt, bridging clips 21 are provided at the corresponding ends of the seat belt in the region of the seat belt winding roller 11 and the end fixtures 17 in order to complete the required closed electrical current or, respectively, voltage potential circuits. A central measurement and evaluation device is designated with the reference number 31.

Figure 2A:
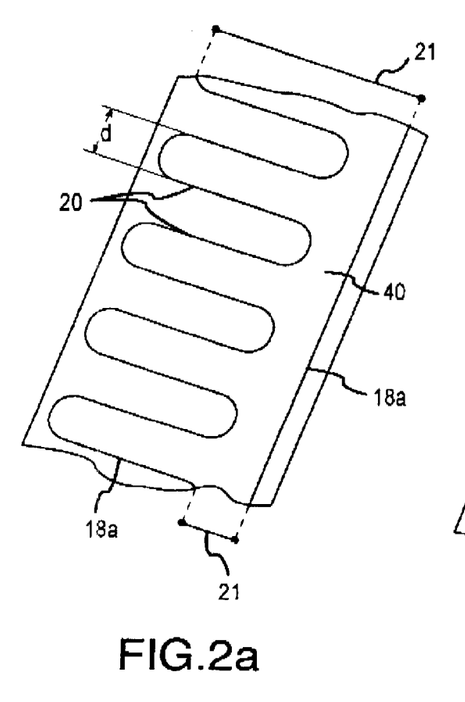
FIG. 2a is an enlarged view of a portion of the seat belt having a serpentine electrical lead, and showing the seat belt portion in an unloaded condition of the seat belt.
Figure 2B:
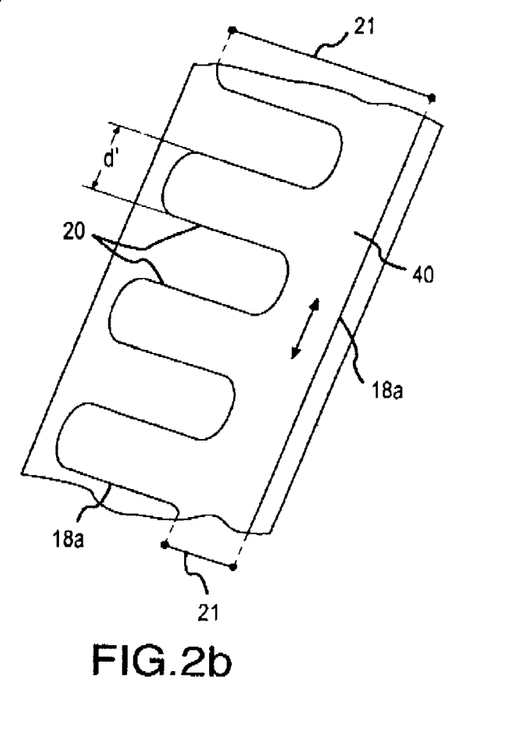
FIG. 2b is an enlarged view of the seat belt portion shown in FIG. 2a during a loaded or tension applied condition of the seat belt.

FIGS. 2a and 2b show an embodiment of the present invention having an arrangement of the electrical leads 18 in which a first electrical lead band 18a extends in a serpentine configuration transverse to the longitudinal axis of the seat belt 40 in a series of windings 20, while a second electrical lead band 18a extends in a straight line path parallel to the edge of the seat belt 40. Bridging clips 21 are disposed at the respective ends of the seat belt 40, which connect together the two individual electrical lead bands 18a into a closed circuit. While the windings 20 of the electrical lead bands 18a shown in the unloaded condition of the seat belt shown in FIG. 2a have a distance d between themselves, upon the application of a pulling or tensioning force to the seat belt, the distance between the windings 20 enlarges to a distance d', as shown in FIG. 2b. To the extent that the supply of electrical current through the electrical leads 18 forms an annular magnetic field which penetrates to the other side of the windings 20, a movement of the windings 20 relative to one another in connection with an extension of the seat belt induces a voltage potential in the electrical leads which is sensed as a variation in the electrical resistance by corresponding sensors (representatively shown as sensors 29, 30 in FIG. 6). A further possibility for the evaluation of the corresponding measuring signals can be realized by the deployment of, for example, Hall sensors, which instantaneously detect the variation in the magnetic field and thereby indicate the applied extension of the seat belt.

Figures 3A, 3B:
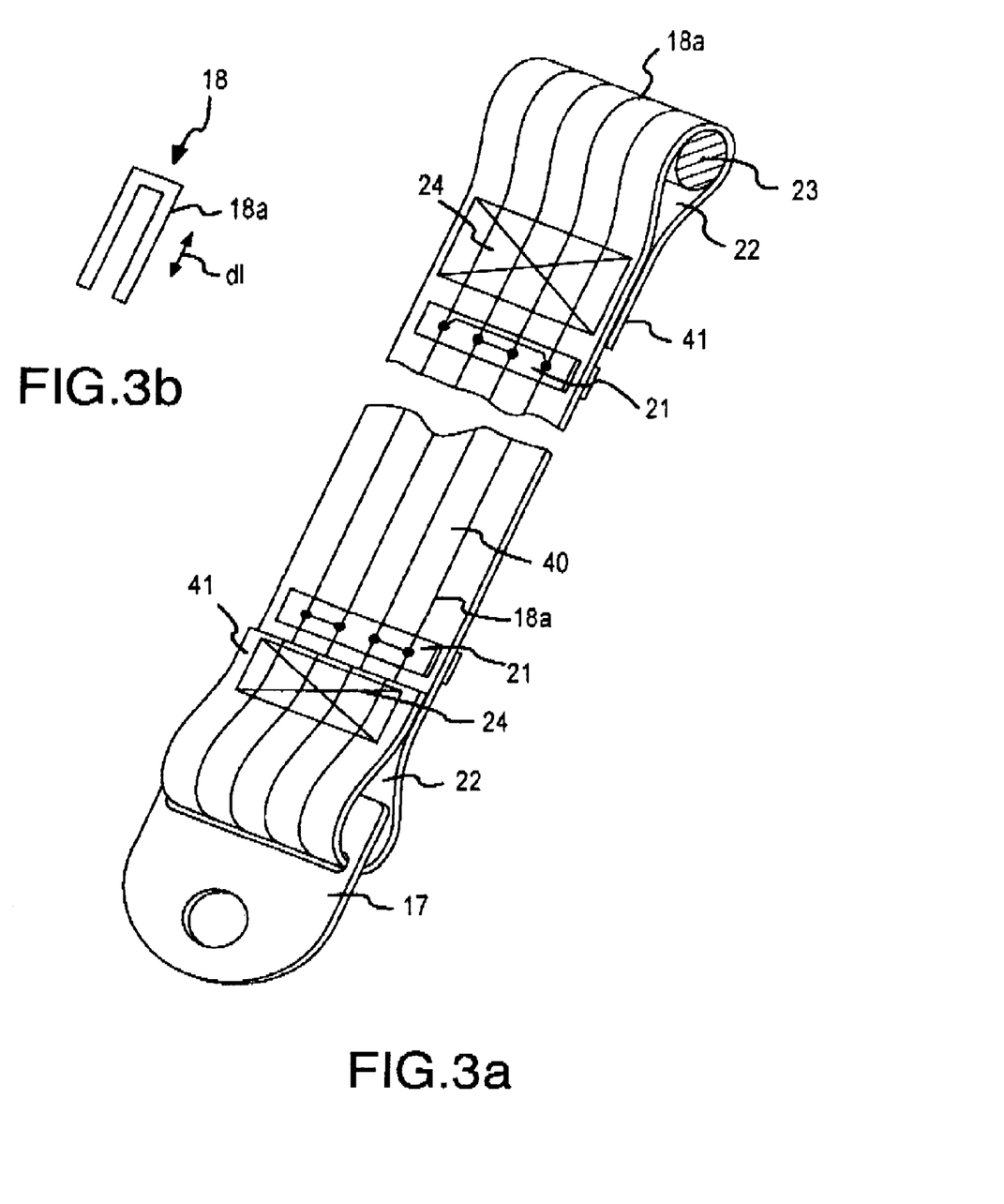

FIGS. 3a and 3b show an embodiment of the present invention which comprises the electrical leads 18 having several electrical lead bands 18a extending parallel to one another in the longitudinal direction of the seat belt 40, whereby, as seen in FIG. 3a, a closed electrical current or, respectively, voltage potential, circuits in the extended seat belt 40 can be seen. Following the layout of the seat belt 40, each seat belt end 41 thereof is configured into a loop 22, whereby this loop is configured either to receive a belt pin 23 of the seat belt winding roller 11 or to fasten the seat belt to the end fixture 17; the respective seat belt end 41 is fixedly connected to the seat belt 40 at a seam location 24. Adjacent the seam location, a respective bridging clip 21 is arranged by means of which the individual electrical lead bands 18 are connected with one another to form a closed electrical current or, respectively, voltage potential, circuit; this is shown, for example, in the schematic representation in FIG. 3b. In connection with this embodiment of the present invention, upon an extension of the seat belt, the electrical lead bands 18 are extended, which results in a variation in the electrical resistance, which is instantaneously sensed by suitable sensors arranged for sensing such variation.

Figures 4A, 4B:
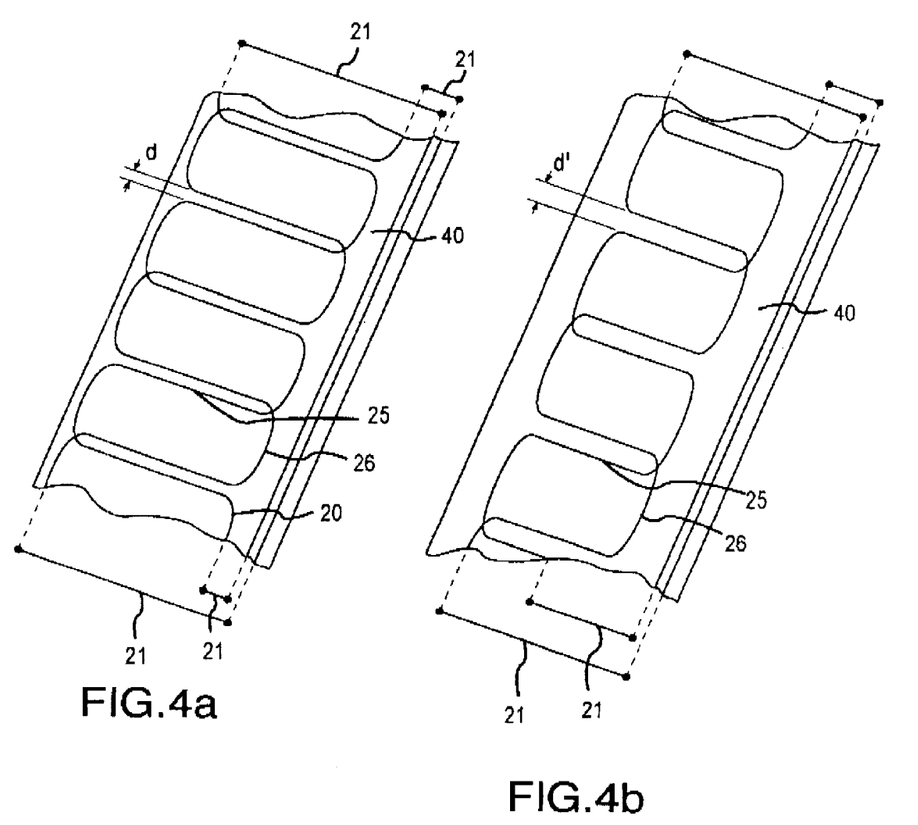
FIG. 4a is an enlarged view of the seat belt portion shown in FIGS. 3a and 3b in a variation thereof.
FIG. 4b is an enlarged view of the seat belt portion shown in FIG. 4a during a loading or tension applied condition of the seat belt.

The embodiment of the present invention shown in FIGS. 4a and 4b comprises a supply lead 25 arranged in serpentine windings 20 on the seat belt 40, the supply electrical lead 25 being operable to have a voltage imposed thereon such that a magnetic field around the electrical lead is produced. A sensor lead 26 is arranged parallel to the supply lead 25 at an offset therefrom relative to the longitudinal axis of the seat belt 40 and is similarly configured, whereby an extension of the seat belt 40 produces corresponding variation in the distance between the supply lead 25 and the sensor lead 26 such that a voltage potential is induced in the sensor lead 26 which is, in any event, capturable or measurable by suitable sensors. Alternatively, the capacitance between the supply lead 25 and the sensor lead 26 can be captured, this capacitance decreasing with increasing distance between the two leads and thereby serving as an indicator of the extent of the extension of the seat belt 40.

Figure 5:
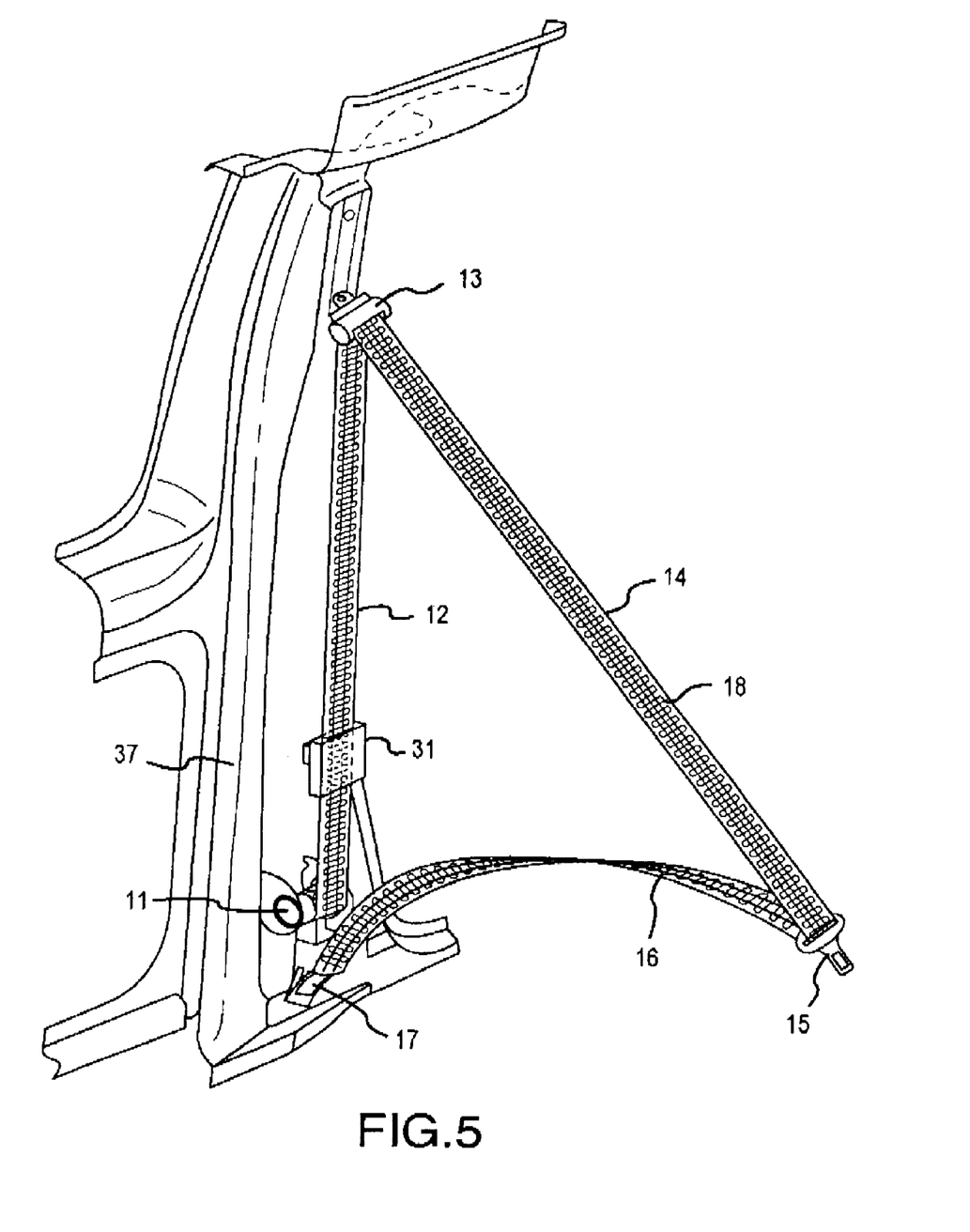
FIG. 5 is an isometric environmental view of the seat belt shown in FIG. 1.
Figure 6:
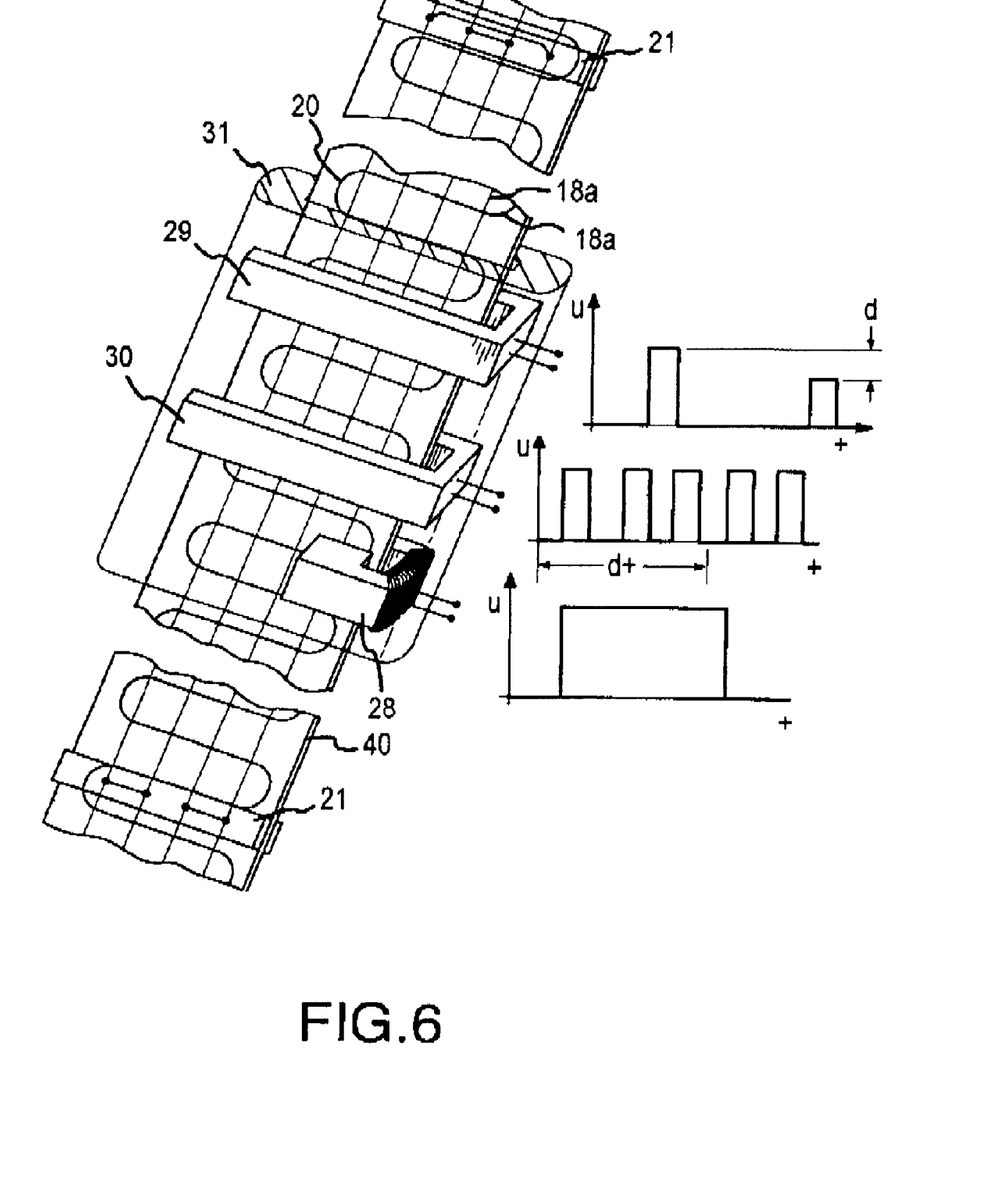
FIG. 6 is an enlarged view, in partial section, of the seat belt shown in FIG. 5 and showing, schematically, the arrangement of the electrical energy source and the measurement device.

FIG. 5 is an environmental view of a full seat belt arrangement having the electrical lead bands extending in a configuration along the longitudinal axis of the seat belt as well as in serpentine windings 20 transverse to the longitudinal axis, whereby the two electrical lead bands overlap one another as is shown in detail in FIG. 6.

As can be seen as well in FIG. 6, an energy supply winding 28 is provided which encircles the seat belt 40 in a non-contacting manner and which supplies electrical energy in a wireless manner.

Various sensors are arranged with respect to the differing paths of the electrical lead bands 18a and include a sensor 29, which captures the electrical resistance variation of the electrical lead bands 18a extending in the longitudinal direction of the seat belt 40, as can be seen in the graphical representation of the voltage potential variation of the sensed voltage potential sensed by the sensor 29.

A second sensor 30 captures the electrical current variation in the windings 20 of the further electrical lead bands 18a; this is graphically represented as well. The graphical representation of the application of a voltage potential on the electrical lead bands 18a via the supply of electricity from the electrical supply winding 28 emphasizes this process.

The measurement signals captured by the sensors 29, 30 are transmitted to an evaluation device which is operable to convert the electrical measurement signals into an indication of the pulling force on the seat belt 40, whereby the electrical measurement signals indicating the extent of the extension of the seat belt serve as an indication of the seat belt pulling force.

The specification incorporates by reference the disclosure of German priority document 100 26 444.1 of May 30, 2000.

The present invention is, of course, in no way restricted to the specific disclosure of the specification and drawings, but also encompasses any modifications within the scope of the appended claims.

What I claim is:

1. A seat belt system for a motor vehicle, comprising:
   a seat belt retractable from a seat belt winding roller and having an extent which passes to and through a connecting tongue for releasably connecting the seat belt to a seat latch and having an end secured to an end fixture fixedly connected to the motor vehicle;
   an electrical lead extending along at least a portion of the longitudinal extent of the seat belt and being connectable to an electrical energy source for the supply of electrical current to the electrical lead, the electrical lead having a serpentine configuration formed by a plurality of windings extending transversely to the electrical lead;
   a measuring device for measuring a variation in an electrical property of the electrical lead which varies in correspondence with the extension of the seat belt due to the application of a pulling force on the seat belt; and
   an evaluation device for evaluating the measurements performed by the measuring device to yield an output representative of the pulling force applied to the seat belt.

2. A seat belt system for a motor vehicle according to claim 1, wherein the electrical lead is woven into the seat belt.

3. A seat belt system for a motor vehicle according to claim 1, wherein the electrical lead includes an electrical supply lead and a sensor electrical lead separate from the electrical supply lead, and wherein the measuring device is operable to measure changes in an electrical property of the sensor electrical lead.

4. A seat belt system for a motor vehicle according to claim 1, wherein the seat belt includes at least one seat belt end formed as a loop and further comprising at least one bridging clip disposable at the loop for completing the circuit of the electrical lead.

5. A seat belt system for a motor vehicle according to claim 1, wherein the electrical supply source includes an electrical winding encircling the seat belt for supplying electricity to the electrical lead in a wireless manner.

6. A seat belt system for a motor vehicle according to claim 1, wherein the measuring device includes a contact at a location at which the seat belt is fixedly connected to the motor vehicle.

7. A seat belt system for a motor vehicle according to claim 1, wherein the measuring device includes sensors arranged in non-contacting manner with respect to the seat belt.

8. A seat belt system for a motor vehicle according to claim 7, wherein the sensors are inductive sensors.

9. A seat belt system for a motor vehicle according to claim 7, wherein the sensors are magnet sensitive sensors.

10. A seat belt system for a motor vehicle according to claim 7, wherein the sensors are Hall sensors.

11. A seat belt system for a motor vehicle according to claim 7, herein the sensors are operable to sense a capacitance characteristic.

12. A seat belt system for a motor vehicle according to claim 1, wherein the evaluation device is operable to evaluate the measurements by the measuring device to yield an output representative of the length of the seat belt which has been unwound from the seat belt winding roller.

13. A seat belt system for a motor vehicle according to claim 1, wherein the evaluation device is operable to evaluate the measurements by the measuring device to yield an output representative of the rate of unwinding of the seat belt.

14. A seat belt system for a motor vehicle, comprising:
   a seat belt retractable from a seat belt winding roller and having an extent which passes to and through a connecting tongue for releasably connecting the seat belt to a seat latch and having an end secured to an end fixture fixedly connected to the motor vehicle;
   an electrical lead extending along at least a portion of the longitudinal extent of the seat belt and being connectable to an electrical energy source for the supply of electrical current to the electrical lead, the electrical lead including a first electrical lead extending generally parallel to the longitudinal axis of the seat belt and a second electrical lead having a plurality of windings transverse to the longitudinal axis of the seat belt and arranged in overlapping relation with the first electrical lead;

a measuring device for measuring a variation in an electrical property of the electrical lead which varies in correspondence with the extension of the seat belt due to the application of a pulling force on the seat belt, the measuring device being operable to measure changes in an electrical property in the first and second electrical leads; and an evaluation device for evaluating the measurements performed by the measuring device to yield an output representative of the pulling force applied to the seat belt.

15. A seat belt system for a motor vehicle comprising:

a seat belt retractable from a seat belt winding roller and having an extent which passes to and through a connecting tongue for releasably connecting the seat belt to a seat latch and having an end secured to an end fixture fixedly connected to the motor vehicle;

an electrical lead extending along at least a portion of the longitudinal extent of the seat belt and being connectable to an electrical energy source for the supply of electrical current to the electrical lead, the electrical lead including an electrical supply lead and a sensor electrical lead separate from the electrical supply lead;

a measuring device for measuring a variation in an electrical property of the electrical lead which varies in correspondence with the extension of the seat belt due to the application of a pulling force on the seat belt, the measuring device being operable to measure changes in an electrical property of the sensor electrical lead; and an evaluation device for evaluating the measurements performed by the measuring device to yield an output representative of the pulling force applied to the seat belt, wherein one portion of the electrical supply lead is arranged generally transversely on the seat belt such that the one portion of the electrical supply lead is not itself longitudinally extended when the seat belt extends in a longitudinal direction, one portion of the sensor electrical lead is arranged generally transversely on the seat belt such that the one portion of the sensor electrical lead is not itself longitudinally extended when the seat belt extends in a longitudinal direction, and the measuring device is operable to measure a variation in an electrical property of the electrical lead which varies in correspondence with the change in longitudinal spacing between the one portion of the electrical supply lead and the one portion of the sensor electrical lead which occurs when the seat belt is longitudinally extended from one position to another position.

16. A seat belt system for a motor vehicle according to claim 15, wherein the measuring device is operable to measure the voltage potential induced between the one portion of the electrical supply lead and the one portion of the sensor electrical lead in correspondence with longitudinal extension of the seat belt.

* * * * *